(12) United States Patent
Arah

(10) Patent No.: US 9,725,333 B2
(45) Date of Patent: Aug. 8, 2017

(54) FLUID VESSEL WITH REMOVABLE AND REVERSIBLE FILTRATION UNIT

(71) Applicant: Alijah Christopher Arah, Bloomfield, CT (US)

(72) Inventor: Alijah Christopher Arah, Bloomfield, CT (US)

( * ) Notice: Subject to any disclaimer, the term of this patent is extended or adjusted under 35 U.S.C. 154(b) by 279 days.

(21) Appl. No.: 14/308,758

(22) Filed: Jun. 19, 2014

(65) Prior Publication Data

US 2015/0239749 A1    Aug. 27, 2015

Related U.S. Application Data

(60) Provisional application No. 61/943,282, filed on Feb. 21, 2014.

(51) Int. Cl.
*B01D 63/02* (2006.01)
*C02F 1/00* (2006.01)
(Continued)

(52) U.S. Cl.
CPC .............. *C02F 1/003* (2013.01); *B01D 61/18* (2013.01); *B01D 63/024* (2013.01);
(Continued)

(58) Field of Classification Search
None
See application file for complete search history.

(56) References Cited

U.S. PATENT DOCUMENTS

| 4,605,500 A | 8/1986 | Takemura et al. |
| 4,735,716 A * | 4/1988 | Petrucci ............... B01D 24/105 210/232 |

(Continued)

OTHER PUBLICATIONS

International Search Report and Written Opinion dated Nov. 19, 2014 (PCT/US2014/043078).

(Continued)

*Primary Examiner* — Bobby Ramdhanie
*Assistant Examiner* — Michael An
(74) *Attorney, Agent, or Firm* — Alix, Yale & Ristas, LLP

(57) ABSTRACT

A fluid storage and dispensing assembly includes a fluid chamber having at least one side wall extending between an upper end and a closed lower end thereby defining a reservoir. A lid connectable proximate the chamber upper end has a first surface and an opposite second surface and defines a fluid inlet connecting the first and second surfaces. The fluid inlet defines an axis and includes a first fluid sealing member. A fluid filtration unit having a first end configured for removable fluid tight attachment to the lid at the second surface and a second end is provided with a filtration channel defined therebetween. The second end defines a filter outlet, and a unit of filter media is positioned between the first and second ends. The filtration outlet is in fluid communication with the fluid inlet when the first end is attached to the lid unit, wherein the first sealing member is configured for releasable attachment in a fluid tight seal with a head of a pressurized fluid source when engaged such that the pressure from the fluid source forces fluid from the source through the filter media and from the filtration outlet into the reservoir.

19 Claims, 7 Drawing Sheets

(51) Int. Cl.
*B01D 61/18* (2006.01)
*C02F 1/44* (2006.01)

(52) U.S. Cl.
CPC .......... *B01D 2313/44* (2013.01); *C02F 1/444* (2013.01); *C02F 2201/004* (2013.01); *C02F 2201/006* (2013.01); *C02F 2307/04* (2013.01)

(56) References Cited

U.S. PATENT DOCUMENTS

| | | | |
|---|---|---|---|
| 4,764,274 A | | 8/1988 | Miller |
| 4,876,006 A | | 10/1989 | Ohkubo et al. |
| 5,028,077 A | * | 7/1991 | Hurst .................... F16L 27/107 285/252 |
| 5,158,581 A | | 10/1992 | Coplan |
| 5,225,078 A | | 7/1993 | Polasky et al. |
| 5,503,742 A | * | 4/1996 | Farley ................... B01D 29/01 210/238 |
| 5,846,416 A | | 12/1998 | Gullett |
| 6,569,329 B1 | * | 5/2003 | Nohren, Jr. ............ B01D 29/15 210/282 |
| 6,632,358 B1 | | 10/2003 | Suga et al. |
| 7,325,579 B2 | * | 2/2008 | Harding ............... A01G 25/145 141/2 |
| 7,972,510 B2 | | 7/2011 | Morita et al. |
| 8,043,502 B2 | | 10/2011 | Nauta |
| 8,080,160 B2 | | 12/2011 | Yanou et al. |
| 8,177,971 B2 | | 5/2012 | Bittle et al. |
| 8,257,590 B2 | | 9/2012 | Taniguchi et al. |
| 8,307,991 B2 | | 11/2012 | Morikawa et al. |
| 2005/0035041 A1 | * | 2/2005 | Nohren, Jr. .............. A45F 3/16 210/209 |
| 2006/0249442 A1 | * | 11/2006 | Yap ......................... C02F 1/003 210/470 |
| 2007/0163942 A1 | | 7/2007 | Tanaka et al. |
| 2008/0017565 A1 | | 1/2008 | Yanou et al. |
| 2008/0105618 A1 | * | 5/2008 | Beckius ............... B01D 63/024 210/650 |
| 2010/0219122 A1 | | 9/2010 | Ogawa et al. |
| 2010/0320135 A1 | * | 12/2010 | Sun ........................ C02F 1/003 210/244 |
| 2012/0012515 A1 | | 1/2012 | Nauta |

OTHER PUBLICATIONS

Sawyer Personal Water Bottle with Filter; product description; Sawyer Products, Inc.; http://sawyer.com/products/sawyer-personal-water-bottle-filter/.

PUR Faucet Water Filters; Kaz USA, Inc.; http://www.purwater.com/water/pur-products/faucet-water-filter/.

International Preliminary Report on Patentability and Written Opinion for PCT/US2014/043078, issued Aug. 23, 2016.

* cited by examiner

FLUID VESSEL WITH REMOVABLE AND REVERSIBLE FILTRATION UNIT

CROSS-REFERENCE TO RELATED APPLICATION

This application claims the priority of U.S. Provisional Application No. 61/943,282, filed on Feb. 21, 2014 entitled "Pitcher With Filtration," the entire disclosure of which is incorporated herein by reference in its entirety.

TECHNICAL FIELD

The present disclosure relates generally to residential filtration fluid vessels, and more particularly, to high capacity pitchers, water bottles or similar devices with a filtration unit having an inlet portion for forming a fluid tight seal with a fluid source and the corresponding filtration unit.

BACKGROUND

One common type of filtered water pitcher uses charcoal activated filters and includes a pitcher having an upper reservoir to which the filter is connected. The water drains through the filter by gravity into a bottom reservoir. With this type of device, the filter cartridge must be replaced when it becomes dirty. Also, the pitcher cannot be fully filled because of the upper reservoir, and because it relies upon gravity, it takes a relatively long period of time to produce a pitcher full of filtered water.

SUMMARY

According to one aspect of the disclosure there is provided a fluid storage and dispensing assembly comprising a fluid chamber having at least one side wall extending between an upper end and a closed lower end, thereby defining a reservoir. A lid unit is connectable proximate the chamber upper end having a first surface and opposite second surface and defining a fluid inlet connecting the first and second surfaces, the fluid inlet defining an axis and including a first fluid sealing member. A fluid filtration unit is provided having a first end configured for removable fluid tight attachment to the lid unit at the second surface and a second end with a filtration channel defined therebetween. The second end defines a filter outlet. A unit of filter media is positioned between the first and second ends, the filtration outlet being in fluid communication with the fluid inlet when the first end is attached to the lid unit. The first sealing member is configured for releasable attachment in a fluid tight seal with a head of a pressurized fluid source when engaged such that the pressure from the fluid source forces fluid from the source through the filter media and from the filtration outlet into the reservoir.

According to another aspect of the disclosure, there is provided a reversible fluid filtration unit, comprising a solid side wall circumscribing an axis defining a flow chamber, the side wall extending between and sealingly connected to a first perforate end cap and a second perforate end cap, the first and second end caps each defining a respective peripheral outer surface. A plurality of porous hollow fiber membranes are positioned within the flow chamber in fluid communication with the perforate portions of the first and second end caps wherein the first and second end caps each includes a sealing member and the respective peripheral outer surfaces comprise substantially identical attachment members configured for releasable fluid tight attachment to a coaxial fluid inlet such that the filtration unit may be attached to the fluid inlet via either the first or second end cap thereby fluidly connecting the inlet with the perforate portions of the attached end cap and the perforate portions of the opposite end cap through the plurality of porous hollow fiber membranes.

According to further aspect of the disclosure a reusable fluid filtration kit is provided comprising a fluid receipt portion defining a substantially annular flow channel extending from an inlet configured for releasable engagement with a head of a fluid source to a lower annular wall, the lower annular wall including a first sealing member A filtration portion extends from a first porous end to a second porous end with a unit of filter media comprising a plurality of porous hollow fibers positioned therebetween in communication with the pores in the first and second ends whereby the hollow fibers filter solid particles from fluid incoming through the first end before the filtered fluid exits the hollow fibers via the second end, the second end including a second sealing member configured for cooperative mating with the first sealing member thereby fluidly connecting the fluid receipt portion inlet to the first open end through the porous hollow fiber media whereby attachment of the fluid receipt portion inlet to a head of a pressurized fluid source creates a fluid tight seal therebetween allowing pressure from the fluid source to force fluid from the source through the hollow fibers thereby releasing and removing solid particles from the hollow fibers.

BRIEF DESCRIPTION OF THE DRAWINGS

Aspects of the preferred embodiment will be described in reference to the drawings in which.

DETAILED DESCRIPTION

Figure 1:
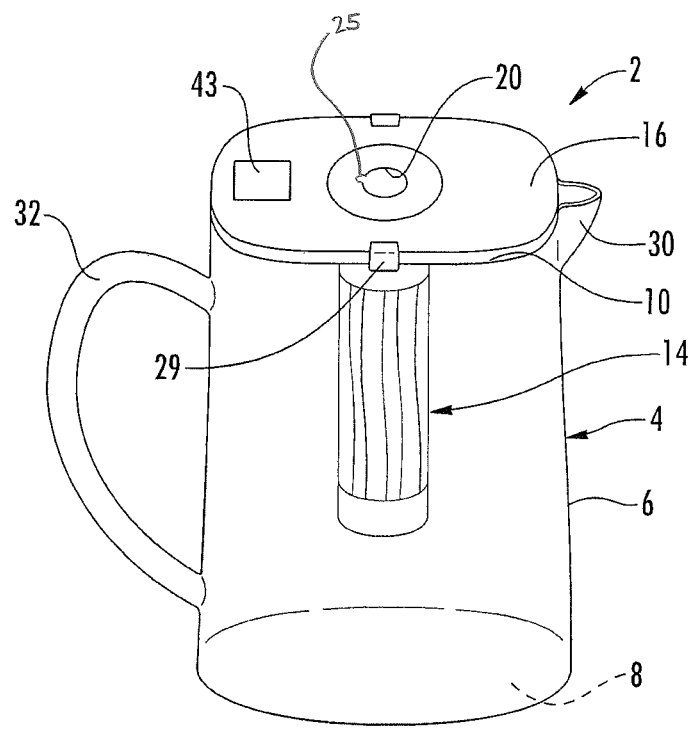
FIG. 1 is a perspective view of a fluid pitcher assembly with the filtration unit as disclosed herein.

Referring to the drawings, wherein like numerals represent like elements throughout, and particularly FIG. 1, there is shown a fluid storage and dispensing assembly 2 including a fluid chamber or reservoir 4 in the form of a water pitcher that is defined by a side wall 6, a closed bottom end 8 and a spaced upper open end 10. A lid 12 is removeably connected to the sidewall 6 proximate the upper end. A fluid filtration unit 14 is removeably affixed to the underside of the lid and extends into the reservoir 4.

More specifically, the lid 12 includes a first surface 16 forming the outside of the lid and a second surface 18 forming the inside or underside of the lid 12. A fluid inlet 20 is provided in the lid 12 between the two surfaces 16 and 18. The fluid inlet 20 has an axis parallel to the axis of the side wall 6 of the reservoir 4.

Figure 5:
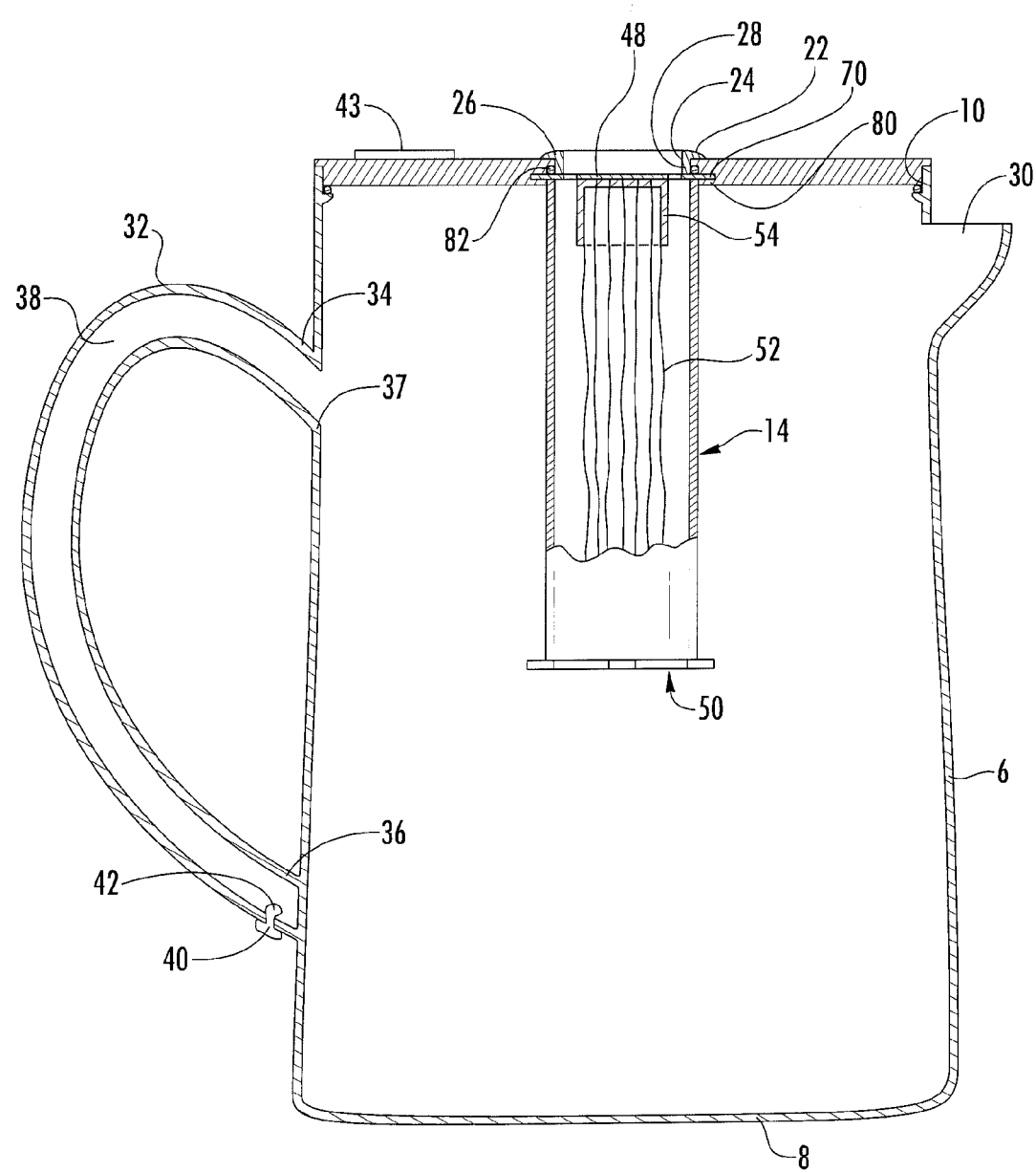
FIG. 5 is a vertical cross sectional view of the pitcher assembly of FIG. 1.
Figure 5A:
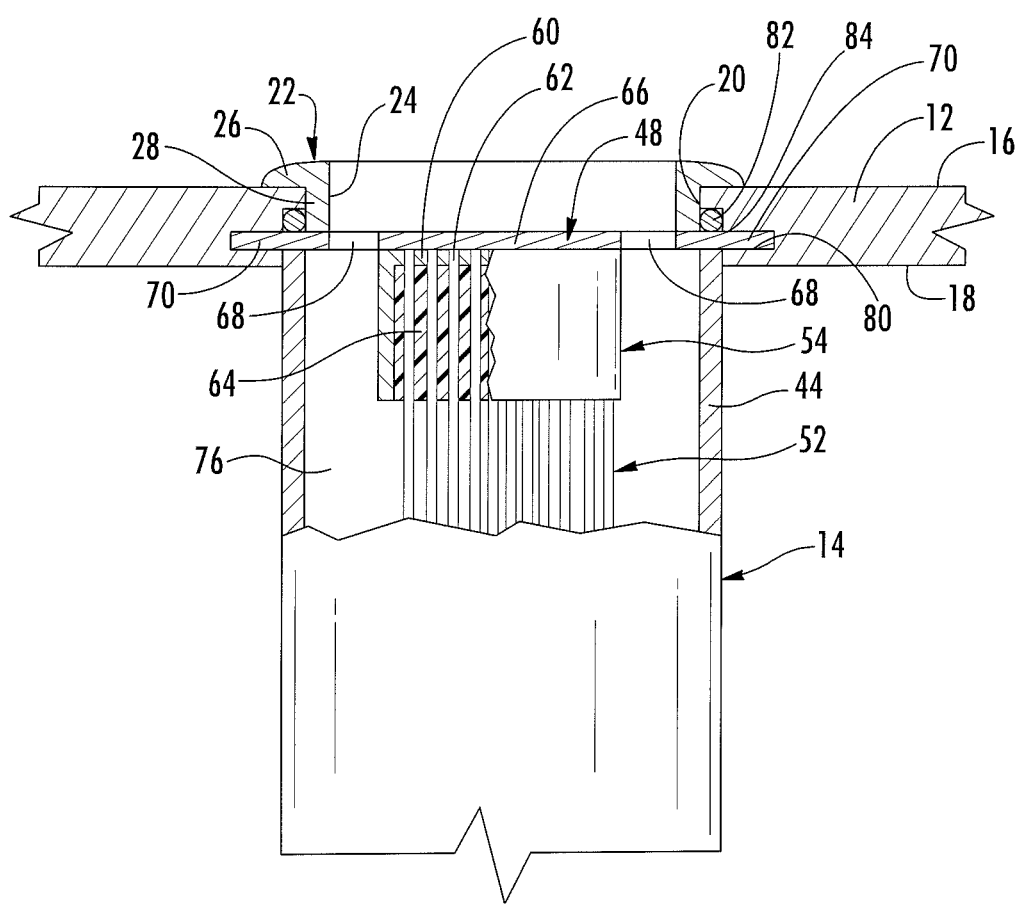
FIG. 5A is an enlarged cross sectional view of the connection between the filter unit and the lid of the pitcher.

As shown in FIG. 5, a fluid sealing member 22 with a central aperture 24 is mounted in the fluid inlet 20. The fluid sealing member 22 may be in the form of a rubber gasket having a flange 26 positioned against the outside 16 of the lid 12 and a tubular body portion 28 extending down from the flange 26 into the fluid inlet 20. The fluid sealing member 22 is designed to provide a releasable attachment to the outlet of a source of pressurized fluid such a faucet and provide a fluid tight seal therebetween. A pair of spaced clamps 29 may be provided on the side of the lid 12 to attach to a suitable projection (not shown) on the side wall 6 of the pitcher to clamp the lid 12 to the pitcher 4.

The pitcher 4 includes a pouring spout 30 at the upper end of the side wall 6. A handle 32 is affixed to the side wall 6 having an upper first end 34 affixed to the side wall 6 at a point slightly spaced downward from the open end 10 of the pitcher 4 and a lower end 36 connected to the pitcher at a point spaced upwardly from the bottom end 8. As shown in FIG. 5, the handle 32 is hollow with the interior 38 of the handle communicating with the interior of the pitcher at the upper end 34 through an opening 37 in the side wall 6. The lower end 36 of the handle 32 is closed. A drain hole 40 is provided in the handle 32 adjacent the lower end 36. A removable plug 42 may be provided in the drain hole 40 for closing the drain hole 40 during regular use of the pitcher. The plug 42 may be removed when filling the pitcher through the filter unit 14 so that the liquid in the reservoir will not rise to a point where it could separate the lid from the reservoir under the pressure of the incoming fluid. With the plug 42 removed, when the fluid level rises to the point where the upper end 34 of the handle opens to the interior of the pitcher 4, the fluid will flow out of the interior of the pitcher 4 into the interior 38 of the handle 32 and down through the drain hole 40 at the bottom of the handle 32. A timer 43 may be mounted in the lid 12 to keep track of filter use.

Figures 3, 3A:
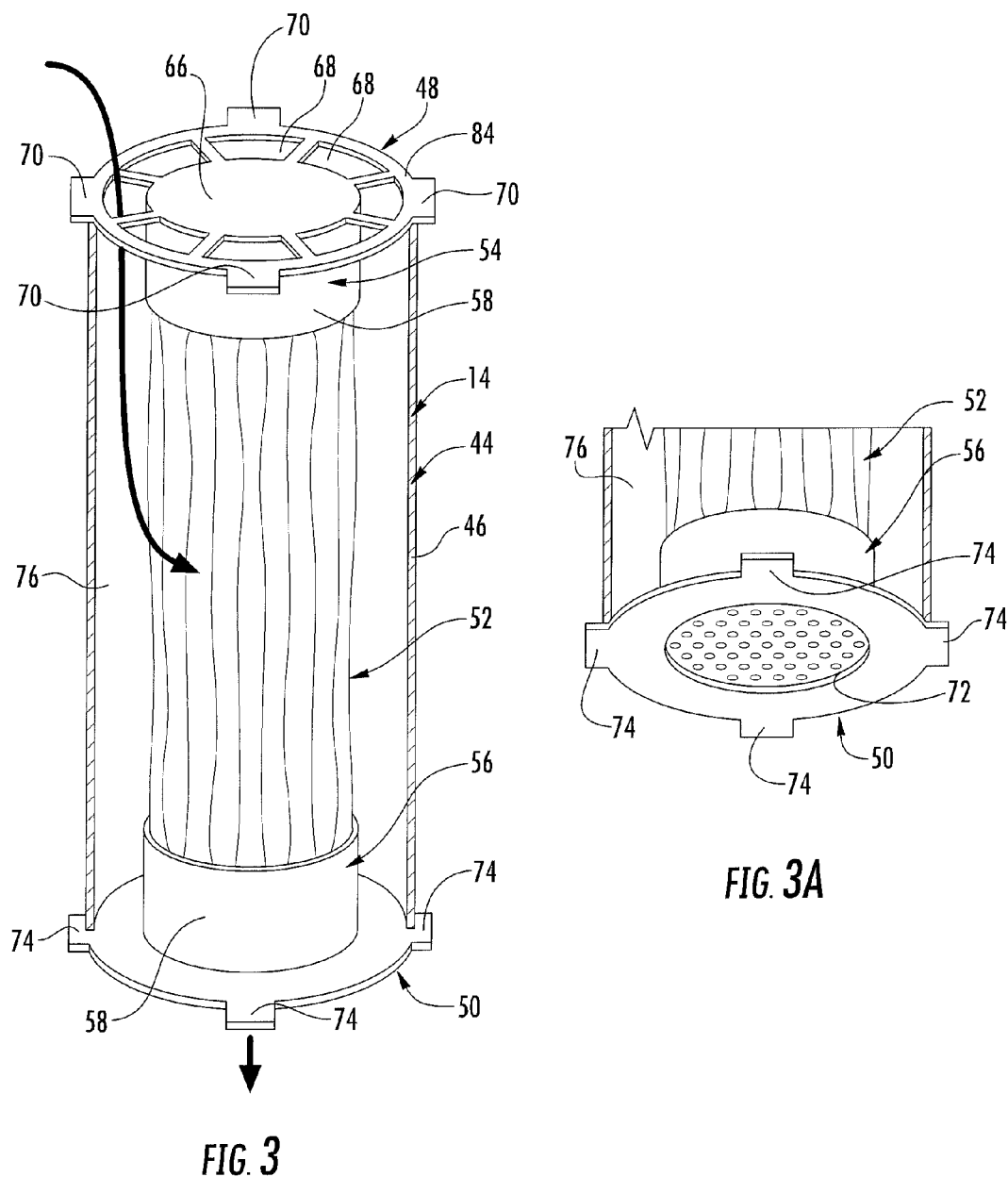
FIG. 3 is a perspective view of the filter unit of FIG. 1.
FIG. 3A is a perspective view looking up at the filter unit of FIG. 3.
Figure 3B:
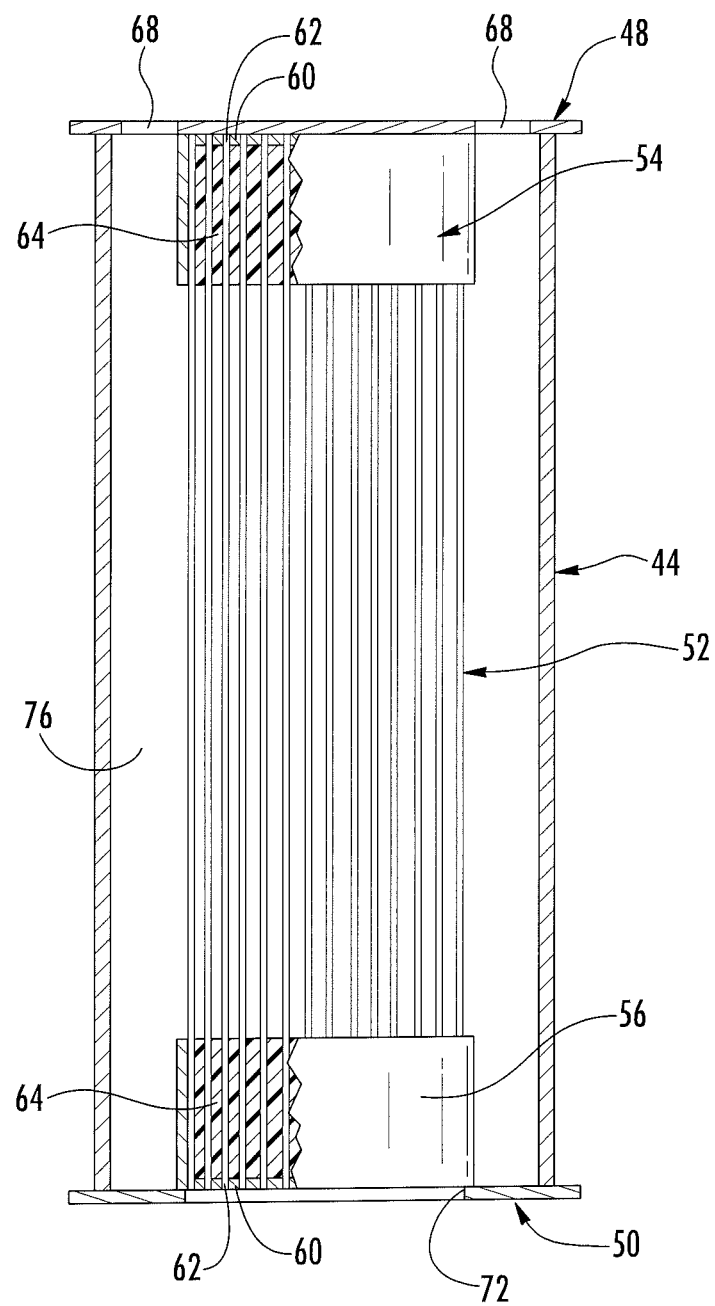
FIG. 3B is a longitudinal sectional view of the filter unit of FIG. 3.

As shown particularly in FIGS. 3, 3A and 3B, the filtration unit 14 may be in the form of a filter cartridge that includes an outer casing 44 defined by a circular side wall 46 circumscribing an axis. The side wall 46 includes an upper and lower end, the upper end of which has an upper end cap 48. The lower end is closed by a bottom end cap 50.

A filter media is in the form of a bundle of hollow fiber membranes 52 mounted in the casing 44. The hollow fiber membranes 52 have their upper and lower ends mounted in an upper and lower membrane cup 54 and 56 respectively. Each membrane cup 54 and 56 includes a cylindrical side portion 58 and a flat bottom portion 60 closing the bottom end of each cup 54 and 56. The bottom portion 60 of each of the cups 54 and 56 includes a series of perforations 62 therethrough. The hollow fiber membranes 52 initially have their ends extending through the perforations, but have them cut flush with the outside surface of the bottom portion 60 before being assembled into the casing. The upper and lower ends are embedded in a resin 64 in their respective membrane cup 54 or 56 to secure the membranes 52 to their respective cup.

The resin 64 may be any suitable non-porous water proof sealant such as a water proof silicon. The hollow fiber membranes 52 may be formed from the resins set for by way of example in U.S. Pat. No. 8,307,799, the disclosure of which is incorporated herein by reference in its entirety. The pores of the hollow fiber membrane may have a size between approximately 0.05 and 0.5 microns and, preferably, between 0.05 and 0.2 microns.

The upper and lower membrane cups 54 and 56 are sealingly attached to an upper and lower end cap 48 and 50 respectively. In the case of the upper end cap 48, such cap is generally flat and includes an inner portion 66 which covers the bottom of the upper membrane cup 54 thereby sealing the upper ends of the hollow fiber membranes. A plurality of circumferentially spaced openings 68 are provided in the upper end cap positioned radially outward of the outside surface cup portion 54. A plurality of fittings shown in the form of circumferentially spaced tabs 70 extend radially outwardly from the circumference of the end cap 54 as shown.

The bottom end cap 50, as shown in FIG. 3A, is generally flat with a central opening 72 therein resulting in the bottom of the membrane cup 56 and therefore the lower ends of the hollow fiber membranes 52 being exposed. The diameter of the opening 68 should be slightly less than the outer diameter of the lower membrane cup 56 to provide support for the membrane 56. The bottom end cap 50 is sealingly connected to the bottom membrane cup 56 so no fluid can leak between the outside of the membrane cup 56 and the end cap into the opening. As with the upper end cap 48, the bottom end cap 50 includes a plurality of circumferentially spaced tabs 74 each of which extends outwardly from the circumference of the end cap 50 as shown.

The upper and lower end caps 54 and 56 are sealed to the casing 44. This results in a chamber 76 being formed between the inner surface of the casing 44 and the bundle of hollow fiber membranes 52.

Figure 2:
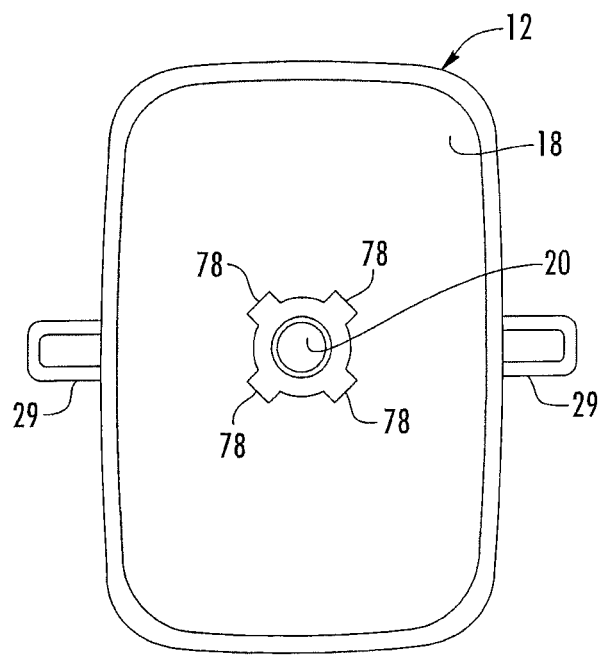
FIG. 2 is a view of the underside of the lid of the pitcher of FIG. 1.

Referring to FIGS. 2 and 5, the underside of the lid 12 is provided with a series of circumferentially spaced slots 78 that communicate with a groove 80 in the side wall of the fluid inlet 20. The slots 78 provide an opening for the tabs 70 on the upper end cap 48 to be inserted into the lid 12 and turned into the groove 80 to provide a bayonet connection between the upper end cap 48 of the filter cartridge 14 and the lid 12. An O-ring seal 82 is provided in a groove in the underside of the lid to seal against a sealing surface 84 on the upper surface of the end cap 48.

The filter cartridge 14 is adapted for the influent to enter the filter cartridge through the openings 68 in the upper end cap 48, pass into the chamber 76 of the filter cartridge 14 formed between the bundle of hollow fiber membranes 52 and the interior of the side wall 46 of the casing 44 and then into the membranes and out through the opening 72 in the bottom end cap 50.

In use, the filter cartridge 14 is attached to the lid of the reservoir by inserting the tabs 70 into the slots 78 of the underside of the lid 12 and twisting the filter cartridge 14 to secure the bayonet connection. With this arrangement, the filter cartridge 14 is sealed against the lid 12 and the lid 12 may be secured to the pitcher 4 by the clamps 29.

Other types of arrangements may be used to connect the filter cartridge to the lid. Threaded male and female members may be provided on the lid and filter cartridge. Also, a threaded ring may be provided between the two members that rotates in one direction tightening the fluid seal and rotates in the other direction to loosen the seal.

The assembled filter cartridge 14, lid 12 and pitcher 4 may then be attached to a source of fluid such as a faucet by means of the fluid sealing member 22 or other appropriate connection, such as an adapter that threads onto the pipe or faucet. The source of fluid may then be turned on, and the pressure of the incoming fluid will cause the fluid to flow through the opening 24 in the sealing member 22 of the lid 12, the openings 68 in the upper end cap 48 and into the chamber 76 between the hollow fiber membranes 52 and the interior surface of the side wall 46 of the casing 44. The influent under pressure will then pass through the walls of the hollow fiber membranes 52 into the interior thereof and then out through the bottom ends of the membranes through the bottom opening 72 in the bottom end cap 50. An orifice 25 may be included in the fluid inlet 20 for relieving a portion of the pressure from the fluid source through the filtration unit 14.

The plug 42 in the bottom of the handle 32 should be removed so that when the effluent flows into the reservoir 4 and fills the reservoir 4 up to the point of the opening into the handle 32, additional effluent will flow through the handle 32 and out the drain opening 40 thereby indicating that the pitcher has been filled and the source of incoming fluid can be shut off.

When the filtration unit 14 becomes clogged or dirty, it can be rejuvenated rather than discarded. To clean the filtration unit, the filter cartridge 14 can be unscrewed from the lid 12 and reversed, attaching the normally discharge end (or lower end as described above) to the underside of the lid 12 using the tabs 74 on the bottom end cap 50 to connect the bayonet connection. A fluid under pressure such as water from a faucet can be caused to flow into the filter unit through the opening 72 in the normally discharge end, whereby the fluid flows into the interior of the hollow fiber membranes and then out through the walls thereof into the channel 76 between the bundle of hollow fiber membranes 52 and the interior of the side wall 46 of the casing 44. The fluid will then flow out through the openings 68 in the influent or upper end cap 48, carrying along with it the filtered particles that have accumulated.

Figure 4:
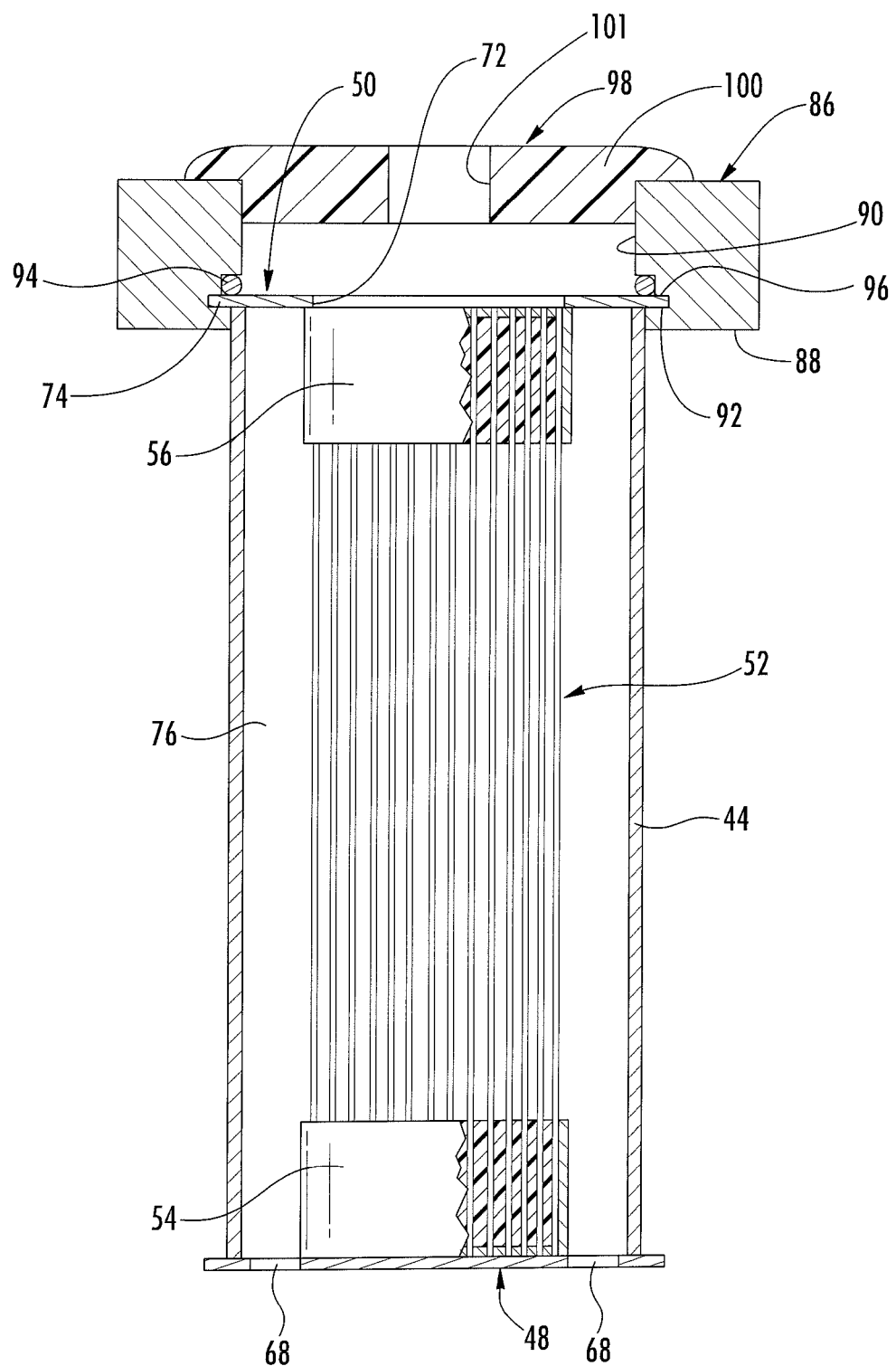
FIG. 4 is a depiction of a backwash attachment for filter rejuvenation as disclosed herein.

An alternative arrangement is shown in FIG. 4. In that arrangement, the filter cartridge 14 is removed from the lid of the pitcher for rejuvenation. A backwash adapter 86 is provided that includes a body 88 having an aperture 90 therein adapted to be sealingly connected to the normally discharge end of the hollow fiber membrane bundle 14. This connection may be similar to the connection between the filter cartridge and lid as described above. The connection may include a series of circumferentially spaced slots that communicate with groove 92 in the side wall of the opening of the body of the adapter. The slots provide an opening for the tabs 74 of the normally discharge end of the fluid cartridge to be inserted into the adapter and turned into the groove to provide a bayonet connection. An O-ring seal 94 is provided in a groove in the underside of the lower portion of the adapter to seal against a sealing surface 96 on the bottom end cap 56 of the filter cartridge.

The adapter includes a connector 98 to sealingly engage a source of a fluid under pressure such as a water faucet. This connection may be a rubber sealing grommet 100 with a central opening 101 mounted in the body 88 of the adapter as shown, a threaded connection or the like. With the connector 98 attached to a source of pressurized fluid such as a water faucet, when the water is turned on, water will be forced to flow into the normally effluent end of the cartridge 14, through the hollow fiber membranes, out through the walls thereof, into the chamber 76 and out through the opening 68 into upper end cap 48 removing the collected filtered particles.

Although the filter cartridge has been described as having the fluid to be filtered flow from the outside though the walls of the hollow fiber membranes into membranes and then out through the ends of the hollow membrane, the filter cartridge could be arranged to have the flow from the inside of the hollow fiber membranes out through the walls thereof.

Figure 6:
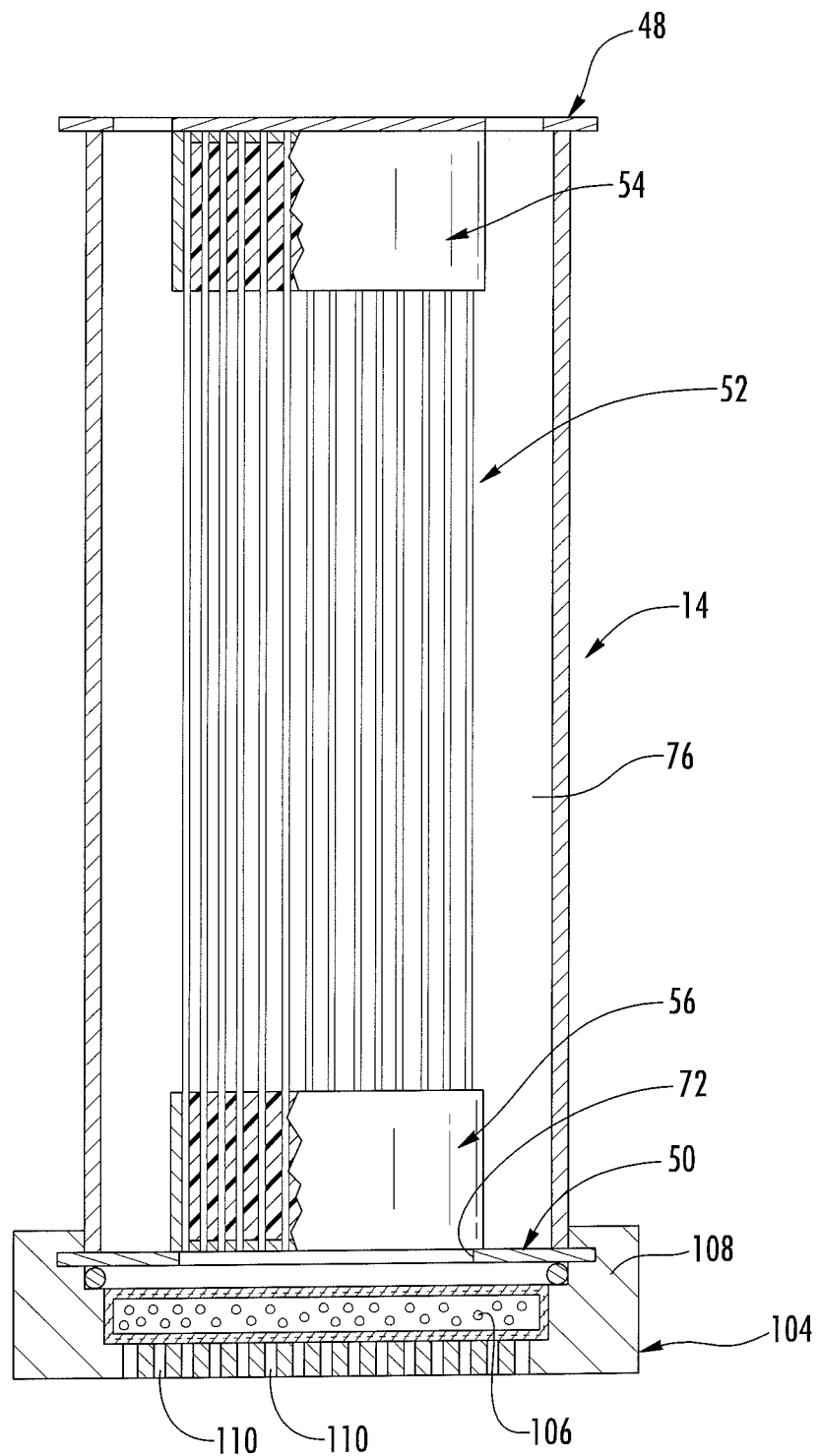
FIG. 6 is a cross-sectional view of another embodiment of the filter unit.

Further, as those skilled in the art understand, the filter cartridge and filtration unit is not limited to including hollow fibers only. Embodiments can exist that include a secondary filter media, such as activated carbon, in combination with hollow fibers such that fluid from a connected source may be filtered through both media. An example of such an embodiment is shown in FIG. 6 wherein a bottom unit 104 is shown containing a sack of activated charcoal 106 attached to the discharge end of the hollow membrane filter cartridge 14. The unit may include a cup-like container 108 in which a sack containing the activated charcoal is contained. The unit may be attached to bottom (effluent end) of the hollow fiber membrane filter cartridge 14 by means of a bayonet connection such as described in connection with the connection of the lid to the filter unit. The bottom of the cup-like container 108 has perforations 110 to allow the filtered fluid to exit the unit. Although the unit is shown attached to the effluent end, arrangements may be had that provide the charcoal unit to be positioned on the influent side of the hollow membrane filter cartridge.

With the above described arrangement, a filtration unit is provided in which the reservoir can be completely filled, the filter cartridge can be rejuvenated by being backwashed, and does not rely on gravity for filling the reservoir.

While specific embodiments have been set forth above for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A fluid storage and dispensing assembly, comprising:
   a fluid chamber having at least one side wall extending between an upper end and a closed lower end, thereby defining a reservoir;
   a lid unit connectable proximate the chamber upper end having a first surface and opposite second surface and defining a fluid inlet connecting the first and second surfaces, the fluid inlet defining an axis and including a first fluid sealing member; and
   a fluid filtration unit having a first end configured for removable fluid tight attachment to the lid unit at the second surface and a second end with a filtration channel defined therebetween, the second end defining a filter outlet, and a unit of filter media positioned between the first and second ends, the filtration outlet being in fluid communication with the fluid inlet when the first end is attached to the lid unit, wherein
   the first sealing member is configured for releasable attachment in a fluid tight seal with a head of a pressurized fluid source when engaged such that the pressure from the fluid source forces fluid from the source through the filter media in a first direction and from the filtration outlet into the reservoir, and the second end of the fluid filtration unit is configured for removable fluid tight attachment to the lid unit at the second surface, thereby allowing the fluid filtration unit to be reversed whereupon pressure from the fluid source forces fluid through the filter media in a second direction opposite of the first direction, removing at least a portion of material present on the filtration media.

2. The fluid storage and dispensing assembly of claim 1, comprising a hollow handle formed in the at least one wall from an upper end in fluid communication with the reservoir to a lower end, having a releasable drain plug therein positioned intermediate the upper and lower ends.

3. The fluid storage and dispensing assembly of claim 1, wherein the fluid filtration unit includes a fitting configured to engage with the lid unit at the second surface in a fluid tight seal to create a fluid channel from the fluid inlet to the filtration unit first end.

4. The fluid storage and dispensing assembly of claim 1, wherein the filter media comprises a plurality of porous hollow fiber membranes for receiving and filtering fluid entering the first end.

5. The fluid storage and dispensing assembly of claim 4, wherein the pores in the hollow fiber membranes have a size of up to approximately 0.5 microns.

6. The fluid storage and dispensing assembly of claim 4, wherein the pores in the hollow fiber membranes have a size between approximately 0.05 microns and approximately 0.2 microns.

7. The fluid storage and dispensing assembly of claim 4 further including an activated charcoal filter media mounted as part of the filtration unit.

8. The fluid storage and dispensing assembly of claim 7 wherein said activated charcoal filter media is mounted downstream of said hollow fiber membranes.

9. The fluid storage and dispensing assembly of claim 1, comprising at least one orifice in the fluid inlet for relieving a portion of the fluid pressure from the fluid source through the filtration unit.

10. The fluid storage and dispensing assembly of claim 1, wherein the first end of the filtration unit and the second surface of the lid unit include cooperative male and female parts of a bayonet connection for attachment of the filtration unit to the lid unit.

11. The fluid storage and dispensing assembly of claim 10, wherein the second end of the filtration unit comprises a part of a bayonet connection that is substantially identical to the part of a bayonet connection on the filtration unit first end.

12. The fluid storage and dispensing assembly of claim 1, wherein the first end of the filtration unit comprises at least one male member and the second surface of the lid unit comprises at least one slotted member configured for mating with the at least one male member to attach the filtration unit to the lid unit via a key locking mechanism.

13. The fluid storage and dispensing assembly of claim 1, wherein the first end of the filtration unit and the second surface of the lid unit include mateable threading for attachment of the filtration unit to the lid unit.

14. The fluid storage and dispensing assembly of claim 1, comprising a threaded ring tightening mechanism around and coaxial with the lid unit inlet, wherein rotation of the threaded ring in one direction tightens the fluid tight seal with the fluid source head and rotation of the threaded ring in the opposite direction loosens the fluid tight seal.

15. The fluid storage and dispensing assembly of claim 1, wherein the lid unit inlet is defined by a ring of malleable material for receiving the fluid source head in a fluid tight seal.

16. The fluid storage and dispensing assembly of claim 1, wherein the first end of the fluid filtration unit includes a series of circumferentially spaced tabs configured to mate with the second surface of the lid unit, and the second end of the fluid filtration unit includes a series of circumferentially spaced tabs configured to mate with the second surface of the lid unit.

17. The fluid storage and dispensing assembly of claim 1, wherein the filter media is a series of hollow fiber membranes.

18. The fluid storage and dispensing assembly of claim 17, wherein solid materials accumulate on the membranes when fluid is forced therethrough in the first direction, and at least a portion of the accumulated solid materials are removed from the membranes via fluid flowing in the second direction.

19. The fluid storage and dispensing assembly of claim 1, wherein the first end of the fluid filtration unit and second end of the fluid filtration unit separately mate with the second surface of the lid unit via a series of tabs and cooperative slots.

* * * * *